United States Patent
Miller et al.

(10) Patent No.: US 9,779,328 B2
(45) Date of Patent: Oct. 3, 2017

(54) RANGE IMAGE GENERATION

(71) Applicant: Intel Corporation, Santa Clara, CA (US)

(72) Inventors: Brett Miller, Menlo Park, CA (US); John Woodfill, Palo Alto, CA (US)

(73) Assignee: INTEL Corporation, Santa Clara, CA (US)

( * ) Notice: Subject to any disclaimer, the term of this patent is extended or adjusted under 35 U.S.C. 154(b) by 0 days.

(21) Appl. No.: 14/838,579

(22) Filed: Aug. 28, 2015

(65) Prior Publication Data
US 2017/0061244 A1    Mar. 2, 2017

(51) Int. Cl.
- G06T 15/00    (2011.01)
- G06K 9/62     (2006.01)
- G06K 9/52     (2006.01)
- G06T 7/593    (2017.01)

(52) U.S. Cl.
CPC ............. G06K 9/6215 (2013.01); G06K 9/52 (2013.01); G06T 7/593 (2017.01); G06T 2207/10012 (2013.01); G06T 2207/20028 (2013.01)

(58) Field of Classification Search
CPC .................. G06T 7/0075; G06T 2207/10012
See application file for complete search history.

(56) References Cited

U.S. PATENT DOCUMENTS

| | | | |
|---|---|---|---|
| 9,275,463 B2 * | 3/2016 | Nanri | G06T 7/0075 |
| 2004/0022431 A1 | 2/2004 | Beardsley | |
| 2009/0041336 A1 * | 2/2009 | Ku | G06T 7/0075 |
| | | | 382/154 |
| 2011/0050853 A1 | 3/2011 | Zhang et al. | |
| 2011/0116706 A1 * | 5/2011 | Baik | G06T 7/0022 |
| | | | 382/154 |
| 2013/0083994 A1 | 4/2013 | Ren et al. | |
| 2014/0205181 A1 | 7/2014 | Woodfill et al. | |
| 2015/0381972 A1 * | 12/2015 | Kowdle | H04N 9/3191 |
| | | | 348/51 |

FOREIGN PATENT DOCUMENTS

EP    2 657 910 A1    10/2013

OTHER PUBLICATIONS

D. Scharstein et al., "A taxonomy and evaluation of dense two-frame stereo correspondence algorithms", Int. J. Comput. Vision, vol. 47, Issue 1-3, Apr. 2002.

(Continued)

Primary Examiner — Brian P Werner
(74) Attorney, Agent, or Firm — Finch & Maloney PLLC

(57) ABSTRACT

Techniques are provided for range image generation. An input image and a reference image are used to compute raw and optimized disparity-space correlation disparity results for each pixel in the reference image. A bilateral filter is applied to both the raw and optimized disparity space correlation disparity results within a neighborhood of a given pixel. For each pixel in the neighborhood, a mean of sub-pixel disparity estimates includes the raw disparity-space correlation disparity result, and another mean of sub-pixel disparity estimates is computed using optimized disparity-space correlation disparity results. The output of the bilateral filter is a weighted sum of the means, with the weights being proportional to the ratio of valid, non-optimized sub-pixel correlation disparity results to optimized sub-pixel correlation disparity results, thereby favoring non-optimized estimates. A sub-pixel range image is generated based at least in part on the sub-pixel disparity estimate for each pixel in the reference image.

18 Claims, 4 Drawing Sheets

(56) References Cited

OTHER PUBLICATIONS

H. Hirschmüller, "Stereo Processing by Semiglobal Matching and Mutual Information", IEEE Transactions on Pattern Analysis and Machine Intelligence, vol. 30, No. 2, Feb. 2008.
Q. Yang et al., "Fusion of Median and Bilateral Filtering for Range Image Upsampling", IEEE Transactions of Image Processing, vol. 22, Issue 12, Aug. 2013.
PCT Search Report and Written Opinion for PCT/US2016/042295, mailed on Oct. 14, 2016, 10 pages.

\* cited by examiner

RANGE IMAGE GENERATION

BACKGROUND

Stereoscopic vision is the reconstruction of a three-dimensional (3D) structure in a 3D scene using two or more images of the 3D scene. Each image is acquired from a different viewpoint or at a different point in time. For instance, two cameras are often used to obtain images from perspectives to the left and right of the scene, or one or more cameras can obtain images of moving scene at different points in time. In stereo vision image processing, two or more images are correlated to form a disparity, or range image, that characterizes the correspondences (displacements) between similar features in the images. However, finding the best algorithms and parameters for stereo vision image correlation is complicated by considerations such as accuracy, completeness, robustness against radiometric and geometric changes, and the selection of optimal window sizes for comparing image regions, among other factors.

DETAILED DESCRIPTION

Figure 1:
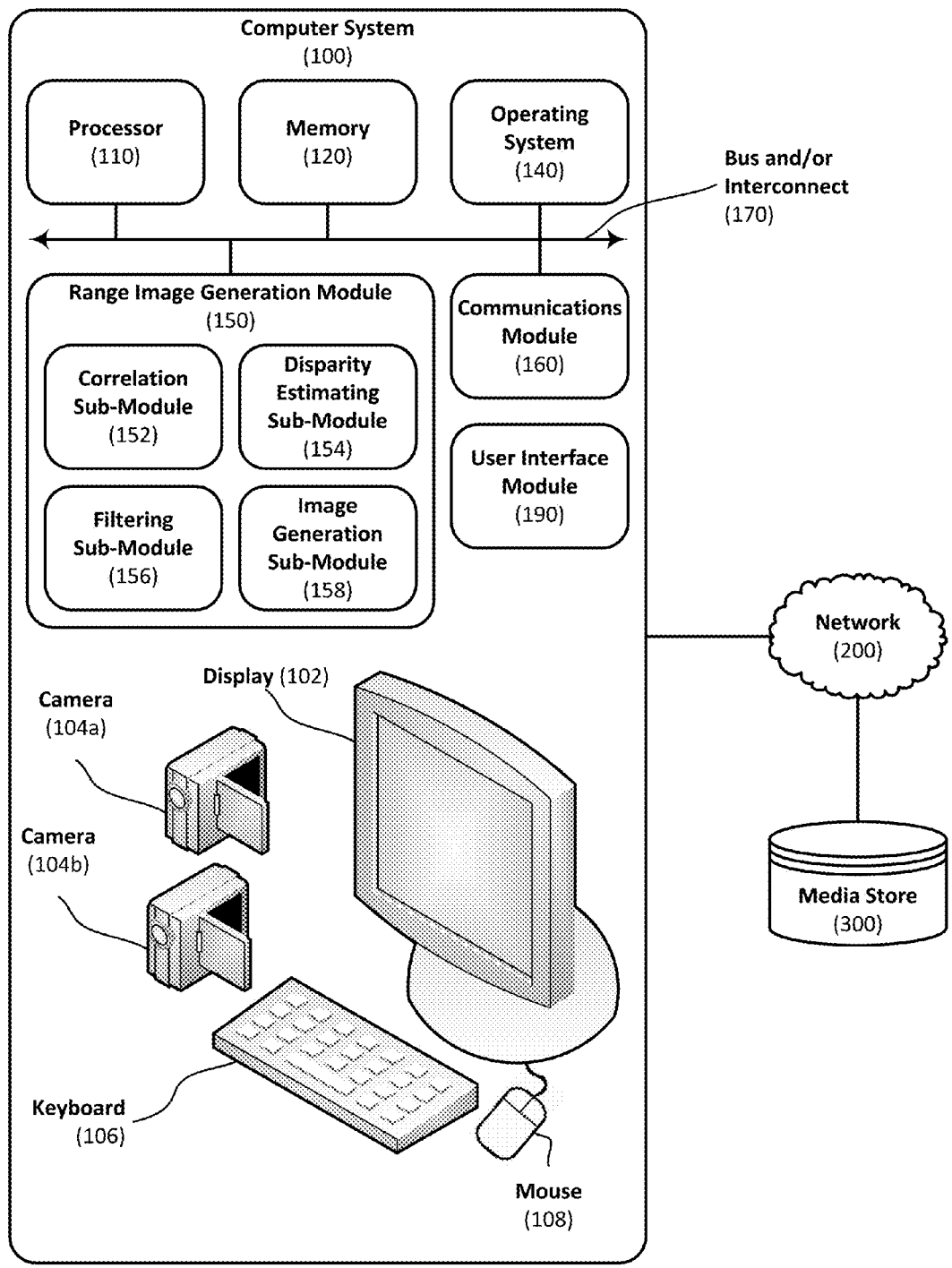
FIG. 1 is a block diagram schematically illustrating selected components of a computer system that can be used to generate a range image, in accordance with certain embodiments.

Techniques are disclosed for range image generation using a combination of different stereo vision image correlation techniques and filters. In accordance with an embodiment of the present disclosure, data representing an input image and a reference image (e.g., the left and right images of a scene taken by a stereoscopic camera) is used to compute a raw disparity-space correlation disparity result and an optimized disparity-space correlation disparity result for each pixel in the reference image. The raw disparity-space correlation disparity result represents a non-optimized disparity between a pixel in a reference image and one or more pixels in the input image. The optimized disparity-space correlation disparity result represents an optimized disparity between the respective pixels (e.g., a scan-line optimized value or a semi-global optimized value). To avoid discontinuities between adjacent pixels having disparity estimates computed using different correlation disparity results, a bilateral filter is applied to both the raw and optimized disparity space correlation disparity results within a neighborhood of a given pixel, at least for the sub-pixel disparity estimates of the respective pixels that have supporting evidence in their neighborhoods (e.g., strong winning disparities). For each pixel, a mean of sub-pixel disparity estimates within a neighborhood surrounding the respective pixel includes the raw disparity-space correlation disparity result. Likewise, another mean of sub-pixel disparity estimates is computed using optimized disparity-space correlation disparity results in the local neighborhood. The output of the bilateral filter is a weighted sum of the means, with the weights being proportional to the ratio of valid, non-optimized sub-pixel correlation disparity results to optimized sub-pixel correlation disparity results, thereby favoring non-optimized estimates when possible. This advantageously allows generation of a range image using the raw sub-pixel disparity estimates wherever possible, which reduces distortions caused by the weighting effects of the optimized sub-pixel disparity estimates. Numerous configurations and variations of such techniques will be apparent in light of this disclosure.

General Overview

Given two or more digital images of the same 3D scene, taken from different points of view, the correspondence problem refers to the task of finding a set of points in one image which can be identified as the same points in another image. The images can be taken from a different point of view, at different times, or with objects in the scene in general motion relative to the camera(s). The correspondence problem can occur when two images of the same scene are used, or more generally, when N images are used. In the latter case, the images may come from either N different cameras photographing at the same time or from N different images taken by one camera which is moving relative to the scene over a period of time.

A digital image can be formed from a collection of pixels arranged in rows and columns. Image data may include data from the visible spectrum, as well as infrared, ultraviolet, x-ray and other image data, including data from any part of the electromagnetic spectrum. One row of pixels is referred to as a scanline. Stereo correspondence of digital images can involve computing a univalued disparity function with respect to a reference image (e.g., the left image or the right image), or some other reference point. The term disparity refers to the difference in pixel coordinates of similar features within the different images of the scene. For instance, the disparity between two images may describe the difference in location of corresponding features in two images as captured by two cameras that may be thought of as the left and right eyes of a human. Pixels representing similar features in the images may, for example, be matched by determining which pixels are most similar between the images. One technique for correlating stereoscopic images includes aggregating a correlation function over an individual pixel and the surrounding pixels of one of the stereo images (e.g., the left image). The information obtained from the aggregate can then be used to match the individual pixel to a corresponding pixel in the other (e.g., right) image. An accurate determination of correspondences between pixels within the respective captured images ensures that the range images are accurate. Accordingly, techniques for improved image disparity estimation are desirable.

Disparity-space can be defined with respect to three dimensions, for example, x (horizontal), y (vertical), and d (depth). In stereo vision, horizontal disparity is most commonly computed, although vertical disparity can be computed from verged viewpoints. For instance, the (x, y) coordinates of the disparity-space coincide with the pixel coordinates of the reference image taken on a linear path, such as a scanline. A disparity function defined over the disparity-space represents the confidence (also referred to as a cost or score) of a particular match between a point or region in the input image and a given pixel in the reference image. The costs can be computed across the entire disparity-space and aggregated to obtain the minimal, or winning, disparity for the reference pixel. In some cases, the raw disparity-space correlation can be optimized to obtain a smoother result by finding minimum differences between neighboring pixel disparities. For example, a scanline optimization technique produces a denser, more continuous disparity-space correlation by computing the minimum cost path for all matching costs between the corresponding scanlines of the input image and the reference image.

After stereo vision image correlation, each pixel in the reference image has a corresponding N-value correlation curve, with each value on the curve corresponding to the score for a particular integer disparity estimate. Collectively, these form a three-dimensional disparity-space image. The stereo disparity can be estimated to a fractional offset by interpolating between the minimum correspondence score and the corresponding correspondence scores of two neighboring pixels. This estimation produces fairly reasonable results due to the fact that the correspondence scores are, to some extent, actual measurements of goodness of fit. Ultimately, the disparity-space correlation curve is reduced to a single value, usually with some form of interpolation between the best-scoring integer disparity and its immediate neighbors to provide a sub-pixel estimate of the best offset. Note that the single value referred to here is a position on the x-axis of the correlation curve graph. That is, the objective is not to know the best score, but rather to know what disparity or displacement in the image matches with the best score. Some pixels may be marked as invalid if the signal for the winning disparity is not strong enough. If the disparity estimates are in discretized space (e.g., integer space), sub-pixel refinement of the disparity estimates can increase the resolution of the correlation.

In semi-global or scan-line optimized stereo correspondence algorithms, the final correspondence score is a combination of the raw disparity-space correlation and weights added to drive the solution image to one with local continuity. However, once the raw correspondence scores have been contaminated with additional weights, the optimized correspondence curves become markedly steeper, and interpolation of the scores for a fractional offset becomes marginal. Furthermore, some optimization methods, such as scan-line optimization or semi-global optimization, reinforce the winning disparity, which distorts the final sub-pixel disparity estimate, or reinforce winning disparities that don't correspond to true objects in the scene.

Thus, and in accordance with certain of the embodiments disclosed herein, techniques are provided for range image generation using a combination of different stereo vision image correlation techniques to reduce distortion, and a bilateral filter to promote smoothing of any discontinuities in the resulting image that are caused by the use of such a combination of different correlation disparity results. In accordance with an embodiment, a weighted sub-pixel disparity estimation can be computed in the reference image using both the raw and optimized correlation curves measured for a given pixel, along with the correlation curves of neighboring pixels within a window. The raw disparity-space correlation is used to compute the sub-pixel disparity for pixels in the reference image where the scan-line optimized result roughly agrees with the result that would have been obtained without scan-line optimization. The estimates from the raw disparity-space correlation are favored because the sub-pixel estimates have not been distorted by optimization. However, the estimates from the raw disparity-space correlation are not available when the winning disparity from the raw disparity-space correlation disagrees with the disparity from the optimized disparity-space correlation. In such cases, the optimized disparity-space correlation is instead used to compute the sub-pixel disparity. In this manner, the sub-pixel disparity estimates for some pixels in the reference image are not based on optimized correlation disparity results, while the sub-pixel disparity estimates for other pixels are based on optimized correlation disparity results, which is in contrast to existing disparity estimation techniques that do not use such a combination of raw and optimized correlation disparity results.

At a given threshold for determining whether to use the raw scores or the scan-line optimized scores, the resulting surface in the disparity-space image may have two surfaces: the surface obtained from the scan-line optimized scores, and the surface obtained from the raw scores. To account for this, a bilateral filter can be used to estimate a smoothed sub-pixel result combining estimates based upon the raw scores and the scan-line optimized scores, in order to produce a dense, smooth disparity image with reasonably good surface continuity while retaining distinctions between boundaries. The bilateral filter preserves disparity discontinuities, using only the statistics of neighboring pixels within a disparity limit of the center pixel. In cases where the neighborhood support is not sufficient for a given disparity result, the pixel is considered an outlier and marked as invalid.

The various methodologies disclosed herein advantageously allow generation of a range image using the raw sub-pixel disparity estimates wherever possible, which reduces distortions caused by the weighting effects of the optimized sub-pixel disparity estimates.

System Architecture

FIG. 1 is a block diagram schematically illustrating selected components of a computer system 100 that can be used to generate range images in accordance with certain embodiments. Computer system 100 may include, for example, one or more desktop or laptop computers, workstations, tablets, smartphones, set-top boxes, or any other such computing device or devices. A combination of different devices may be used in certain embodiments. In the illustrated embodiment, computer system 100 includes, among other things, a processor 110, a memory 120, an operating system 140, a range image generation module 150, and a communications module 160. As can be further seen, a bus and/or interconnect 170 is also provided to allow for intra-device communications using, for example, communications module 160. Computer system 100 can be coupled to a network 200 to allow for communications with other computing devices or resources, such as a networked media store 300 for storing, e.g., image data. Other componentry and functionality not reflected in the schematic block diagram of FIG. 1 will be apparent in light of this disclosure, and it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disk drive, a universal serial bus (USB) drive, flash memory and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 160 can be any appropriate network chip or chipset which allows for wired and/or wireless connection to other components of computer system 100 and/or network 200, thereby enabling computer system 100 to communicate with other local and/or remote computing systems, servers, and/or resources.

Range image generation module 150 is configured to process an input image and a reference image to generate a range image. Range image generation module 150 can be implemented or otherwise used in conjunction with a variety of suitable software and/or hardware that is coupled to or that otherwise forms a part of computer system 100. For example, in terms of software, in certain embodiments range image generation module 150 can be implemented or otherwise used in conjunction with one or more cameras 104a, 104b that are capable of providing the input image, the reference image, or both. Range image generation module 150 can additionally or alternatively be implemented or otherwise used in conjunction with a user interface module 190 that is capable of providing information to, and receiving information and commands from, a user. In terms of hardware, range image generation module 150 can be implemented or otherwise used in conjunction with input/output devices such as a display 102, camera 104, a textual input device such as a keyboard 106, and a pointer-based input device such as a mouse 108. Other input/output devices that may be used in other embodiments include a touchscreen, a touchpad, a speaker, and/or a microphone. Still other input/output devices can be used in other embodiments.

In certain embodiments range image generation module 150 is installed local to computer system 100, as shown in the example embodiment of FIG. 1. Alternatively, computer system 100 can be implemented in a client-server arrangement wherein at least some functionality associated with range image generation module 150 is provided to client computing system 100 using an applet, such as a JavaScript applet, or other downloadable module. Such a remotely accessible module or sub-module can be provisioned in real-time in response to a request from a client computing system for access to a given server having resources that are of interest to the user of the client computing system. For example, a user of a tablet computer may invoke functionality associated with range image generation module 150 upon accessing a networked media store 300 containing images which are to be processed. In such embodiments the server can be local to network 200 or remotely coupled to network 200 by one or more other networks and/or communication channels. In some cases access to resources on a given network or computing system may require credentials such as usernames, passwords, and/or compliance with any other suitable security mechanism. In any such stand-alone or networked computing scenarios, range image generation module 150 may be implemented with any suitable technologies that allow a user to generate range images.

Still referring to FIG. 1, in certain embodiments range image generation module 150 includes a correlation sub-module 152, a disparity estimating sub-module 154, a filtering sub-module 156, and an image generation sub-module 158. Correlation sub-module 152 can be used, for example, to compute raw and optimized disparity-space correlation disparity results for a given pixel in the reference image. Such a correlation can be based on pixel data in the input image. Disparity estimating sub-module 154 can be used, for example, to compute sub-pixel disparity estimates using both the raw disparity-space correlation disparity result and the optimized disparity-space correlation disparity result. Filtering sub-module 156 can be used, for example, to apply a bilateral filter to at least some of the sub-pixel disparity estimates. Image generation sub-module 158 can be used, for example, to generate a range image resulting from the filtered disparity estimates. Thus the functionality provided by the various sub-modules comprising range image generation module 150 enable a range image to be generated from an input image and a reference image using a combination of raw and optimized stereo vision correlation disparity results, and filters for smoothing any discontinuities caused by the use of such a combination of correlation disparity results. Additional details regarding the operation of these modules are provided in the "Methodology" sub-section below.

The various embodiments disclosed herein can be implemented in various forms of hardware, software, firmware, and/or special purpose processors. For example in one embodiment a non-transitory computer readable medium has instructions encoded thereon that, when executed by one or more processors, cause one or more of the object tracking methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments range image generation module 150 provides range image generation by leveraging processing resources provided by a remote computer system accessible via network 200. In other embodiments the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments computer system 100 may comprise additional, fewer, or alternative subcomponents as compared to those included in the example embodiment of FIG. 1.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Methodology

Figure 2:
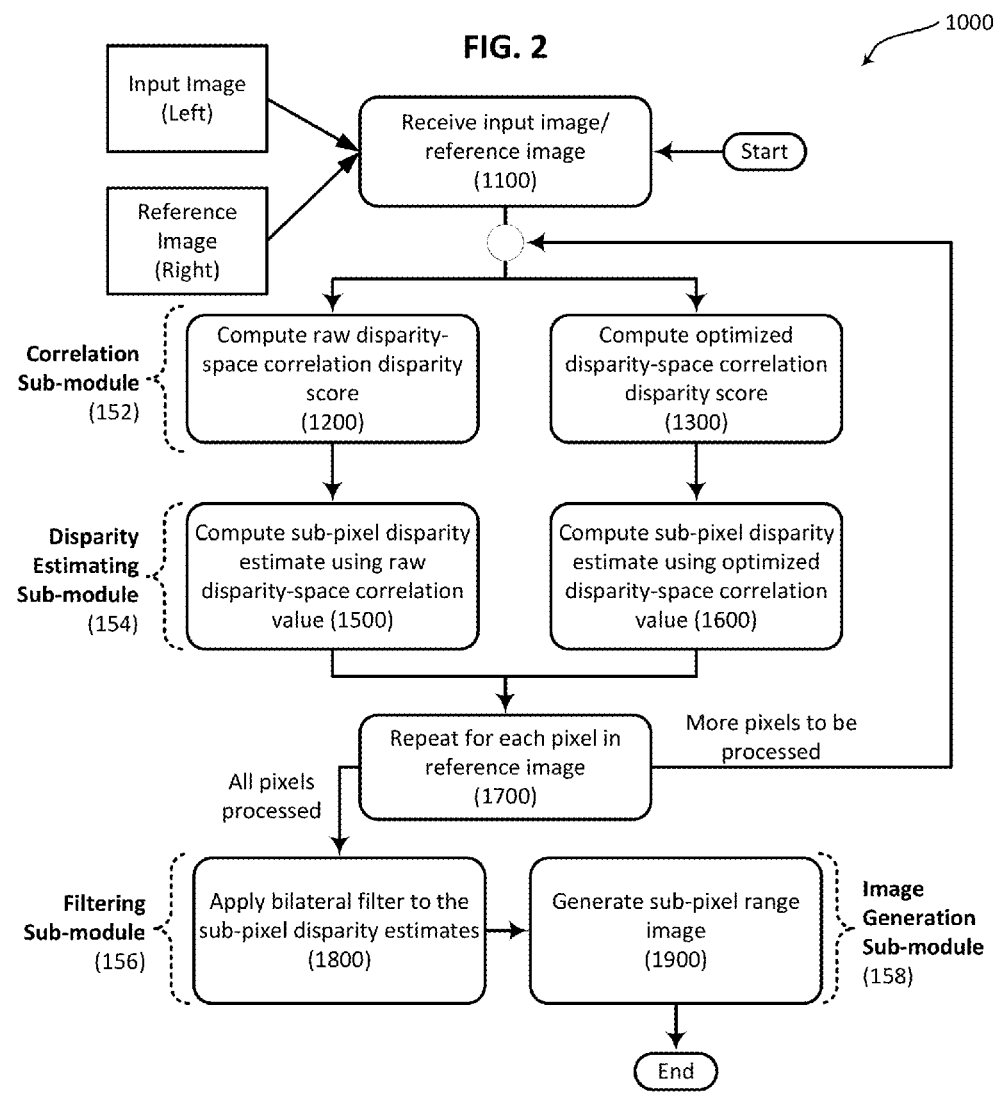
FIG. 2 is a data flow diagram schematically illustrating a technique for generating a range image, in accordance with certain embodiments.

FIG. 2 is a flowchart illustrating an example method 1000 for generating range images, in accordance with an embodiment of the present disclosure. As can be seen, example method 1000 includes a number of phases and sub-processes, the sequence of which may vary form one embodiment to another. However, when considered in the aggregate, these phases and sub-processes form a range image generation process that can be made responsive to user commands in accordance with certain of the embodiments disclosed herein. These embodiments can be implemented, for example using the system architecture illustrated in FIG. 1, as described above. However other system architectures can be used in other embodiments, as will be apparent in light of this disclosure. To this end, the correlation of the various functions shown in FIG. 2 to the specific components illustrated in FIG. 1 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 1000. Thus other embodiments may have fewer or more modules and/or sub-modules depending on the granularity of implementation. Numerous variations and alternative configurations will be apparent in light of this disclosure.

As illustrated in FIG. 2, in one embodiment range image generation method 1000 commences by receiving 1100 an input image, a reference image, or both. In the case of stereo imaging, the input image and the reference image may, for example, be the left and right images taken by one or more cameras at the same time. However, it will be appreciated that the images may come from either N different cameras photographing at the same time or from N different images taken by one camera which is moving relative to the scene over a period of time. Next, the raw and optimized disparity-space correlation disparity results are computed 1200, 1300 from the input image and the reference image for a given pixel in the reference image. Either or both of the computations 1200, 1300 may be performed, for example, by correlation sub-module 152 of FIG. 1, and in any sequence. In certain embodiments, the raw disparity-space correlation disparity result represents the unweighted coordinate offset between the given pixel in the reference image and a matching pixel in the input image. In certain embodiments, the optimized disparity-space correlation disparity result is based on existing scan-line or semi-global optimization techniques, such as described by Scharstein et al. in A Taxonomy and Evaluation of Dense Two-Frame Stereo Correspondence Algorithms, International Journal of Computer Vision, Vol. 47, Issue 1-3, April 2002, and by Hirschmüller in Stereo Processing by Semiglobal Matching and Mutual Information, IEEE Transactions on Pattern Analysis and Machine Intelligence, Vol. 30, No. 2, February 2008. Other suitable techniques for computing the raw and optimized disparity-space estimates will be apparent in view of this disclosure.

Once the raw and optimized disparity-space estimates are computed, sub-pixel disparity estimates for all pixels are computed 1500 using the raw disparity-space correlation disparity results and the optimized disparity-space correlation disparity results. The computations 1500 may be performed, for example, by disparity estimating sub-module 154 of FIG. 1.

After sufficiently many pixels in the reference image have been processed as described above, a bilateral filter is applied 1800 to both the raw and optimized sub-pixel disparity estimates prior to generating 1900 the final sub-pixel precision disparity image. The bilateral filter smoothly transforms between areas where raw and optimized sub-pixel disparity estimates agree and where they do not agree. Any disparity estimates without sufficient local supporting evidence in their neighborhoods is discarded. The bilateral filter may be applied 1800, for example, by filtering sub-module 156, and the range image may be generated 1900 by image generation sub-module 158.

Example System

Figure 3:
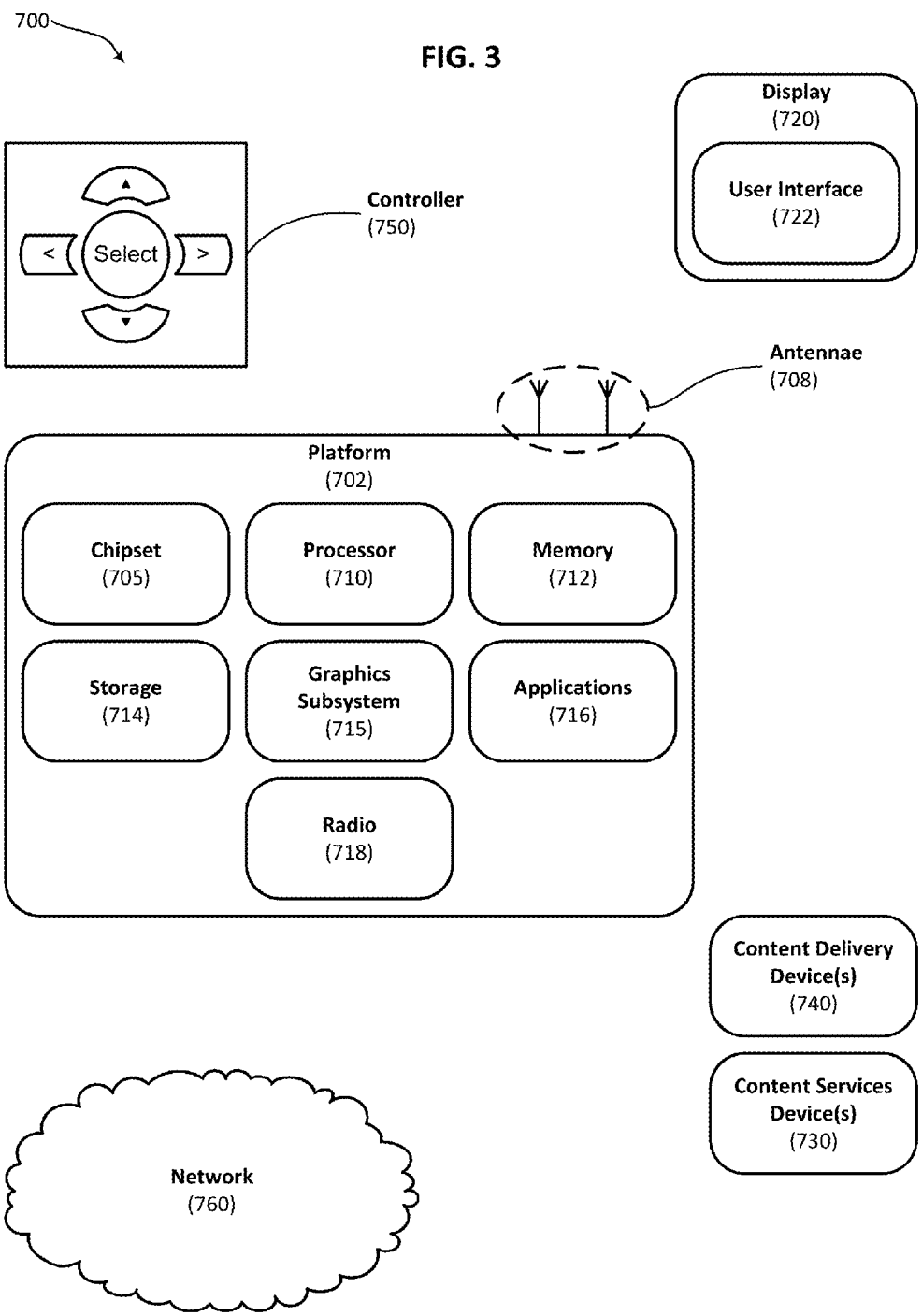
FIG. 3 is a block diagram schematically illustrating a media system configured in accordance with certain of the embodiments disclosed herein.

FIG. 3 illustrates an example system 700 that may carry out range image generation, as described herein. In some embodiments system 700 may be a media system although system 700 is not limited to this context. For example, system 700 may be incorporated into a personal computer, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. In embodiments, system 700 comprises a platform 702 coupled to a display 720. Platform 702 may receive content form a content device such as content services device(s) 730 or content delivery device(s) 740 or other similar content sources. A navigation controller 750 comprising one or more navigation features may be used to interact with, for example, platform 702 and/or display 720. Each of these components is described in more detail in turn.

In embodiments, platform 702 may comprise any combination of a chipset 705, a processor 710, a memory 712, a storage 714, a graphics subsystem 715, applications 716, and/or a radio 718. Chipset 705 may provide intercommunication among processor 710, memory 712, storage 714, graphics subsystem 715, applications 716, and/or radio 718. For example, chipset 705 may include a storage adaptor (not illustrated) capable of providing intercommunication with storage 714. Processor 710 may be implemented as complex instruction set computer (CISC) or reduced instruction set computer (RISC) processors, x86 instruction set compatible processors, multicore, or any other microprocessor or central processing unit (CPU). In embodiments, processor 710 may comprise dual core processor(s), dual core mobile processor(s), and so forth. Memory 712 may be implemented as a volatile memory device such as, but not limited to, a RAM, dynamic RAM (DRAM), or static RAM (SRAM) device. Storage 714 may be implemented as a non-volatile storage device such as, but not limited to, a magnetic disk drive, optical disk drive, tape drive, an internal storage device, an attached storage device, flash memory, battery backed-up synchronous DRAM (SDRAM), and/or a network accessible storage device. In embodiments, storage 714 may comprise technology to increase the storage performance enhanced protection for valuable digital media when multiple hard drives are included, for example.

Graphics subsystem 715 may perform processing of images for display. Graphics subsystem 715 may be a graphics processing unit or a visual processing unit (VPU), for example. An analog or digital interface may be used to communicatively couple graphics subsystem 715 and display 720. For example, the interface may be any of a high definition multimedia interface (HDMI), DisplayPort, wireless HDMI, and/or any other suitable interface using wireless high definition compliant techniques. Graphics subsystem 715 could be integrated into processor 710 or chipset 705. Graphics subsystem 715 could be a standalone card communicatively coupled to chipset 705. The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Radio 718 may include one or more radios capable of transmitting and receiving signals using various suitable wireless communication techniques. Such techniques may involve communications across one or more wireless networks. Exemplary wireless networks include, but are not limited to, wireless local area networks, wireless personal area networks, wireless metropolitan area networks, cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touchscreen display, video monitor, television-like device, and/or a television. Display 720 may be digital and/or analog. In embodiments, display 720 may be a holographic display. Also, display 720 may be a transparent or opaque surface that may receive a visual projection. Such projections may convey various forms of information, images, and/or objects. For example, such projections may be a visual overlay for a mobile augmented reality (MAR) application. Under the control of one or more software applications 716, platform 702 may display a user interface 722 on display 720.

In embodiments, content services device(s) 730 may be hosted by any national, international, and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (for example, by sending and/or receiving) media information to and from network 760. Content delivery device(s) 740 also may be coupled to platform 702 and/or to display 720. In embodiments, content services device(s) 730 may comprise a cable television box, personal computer, network, telephone, Internet enabled device or appliance capable of delivering digital information and/or content, and any other similar device capable of unidirectional or bidirectional communication of content between content providers and platform 702 and/or display 720, via network 760 or directly. It will be appreciated that the content may be communicated in a unidirectional and/or bidirectional manner to and from any one of the components in system 700 and a content provider via network 760. Examples of content may include any media information including, for example, video, music, medical and gaming information, and so forth. Content services device(s) 730 receive content such as cable television programming including media information, digital information, and/or other content. Examples of content providers may include any cable or satellite television or radio or Internet content providers. The provided examples are not meant to limit other embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (such as continuous and multidimensional) data into a computer. Many systems such as graphical user interfaces, televisions, and monitors allow the user to control and provide data to the computer or television using physical gestures. Movements of the navigation features of controller 750 may be echoed on a display, such as display 720, by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers, which are not illustrated for clarity, may comprise technology to enable users to instantly turn on and off platform 702 like a television with the touch of a button after initial boot up, when enabled, for example. Program logic may allow platform 702 to stream content to media adaptors or other content services device(s) 730 or content delivery device(s) 740 when the platform is turned "off". In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a Peripheral Component Interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated. In various embodiments, platform 702 and display 720 may be an integrated unit. Display 720 and content services device(s) 730 may be integrated, or display and content delivery device(s) 740 may be integrated, for example. These examples are not meant to limit other embodiments.

In various embodiments, system 700 may be implemented as a wireless system, a wired system, or a combination of both. When implemented as a wireless system, system 700 may include components and interfaces suitable for communicating over a wireless shared media, such as one or more antennae 708, transmitters, receivers, transceivers, amplifiers, filters, control logic, and so forth. An example of wireless shared media may include portions of a wireless spectrum, such as the radiofrequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Platform 702 may establish one or more logical or physical channels to communicate information. The information may include media information and control information. Media information may refer to any data representing content meant for a user. Examples of content may include, for example, digital images, data form a voice conversation, videoconference, streaming video, electronic mail ("email") messages, voice mail messages, alphanumeric symbols, graphics, video, text, and so forth. Data from a voice conversation may be, for example, speech information, silence periods, background noise, comfort noise, tones, and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
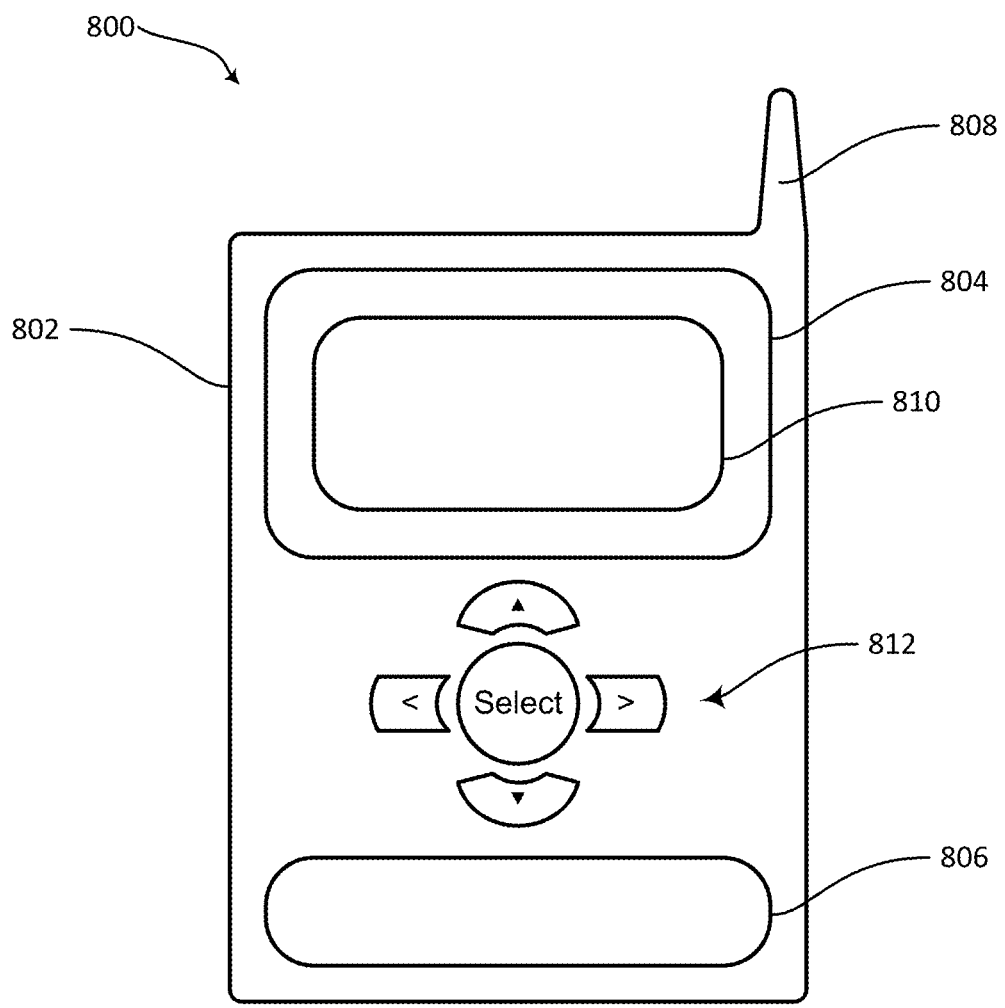
FIG. 4 is a block diagram schematically illustrating a mobile computing system configured in accordance with certain of the embodiments disclosed herein.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example. As described herein, examples of a mobile computing device may include a personal computer, laptop computer, ultra-laptop computer, tablet, touchpad, portable computer, handheld computer, palmtop computer, PDA, cellular telephone, combination cellular telephone and PDA, television, smart device (for example, smartphone, smart tablet or smart television), MID, messaging device, data communication device, and so forth. Examples of a mobile computing device also may include computers that are arranged to be worn by a person such as a wrist computer, finger computer, ring computer, eyeglass computer, belt clip computer, armband computer, shoe computer, clothing computer, and other wearable computers. In embodiments, for example, a mobile computing device may be implemented as a smartphone capable of executing computer applications, as well as voice communications and/or data communications. Although some embodiments may be described with a mobile computer device implemented as smartphone by way of example, it may be appreciated that other embodies may be implemented using other wireless mobile computing devices as well. The embodiments are not limited in this context.

As shown in FIG. 4, device 800 may comprise a housing 802, a display 804, an input/output device 806, and an antenna 808. Device 800 also may comprise navigation features 812. Display 804 may comprise any suitable display unit for displaying information appropriate for a mobile computing device, such as a user interface 810. Input/output device 806 may comprise any suitable input/output device for entering information into a mobile computing device. Examples for input/output device 806 may include an alphanumeric keyboard, a number keypad, a touchpad, input keys, buttons, switches, rocker switches, microphones, speakers, voice recognition devices, software, and so forth. Information also may be entered into device 800 by way of microphone. Such information may be digitized by a voice recognition device or service. The embodiments are not limited in this context.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still cooperate or interact with each other.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing", "computing", "calculating", "determining", or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for generating a range image. The method comprises receiving, by a computer processor, data representing an input image. The method further comprises computing, by the computer processor, a raw disparity-space correlation disparity result representing a non-optimized disparity between a first pixel in a reference image and a second pixel in the input image, and computing, by the computer processor, an optimized disparity-space correlation disparity result representing a disparity between the first pixel and the second pixel. The method further comprises computing, by the computer processor, both raw and optimized sub-pixel disparity estimates.

Example 2 includes the subject matter of Example 1, wherein the generating of the range image comprises applying, by the computer processor, a bilateral filter to raw and optimized sub-pixel disparity estimates of at least two adjacent pixels in the reference image.

Example 3 includes the subject matter of Example 2, wherein the sub-pixel disparity estimate of one of the adjacent pixels is computed using the raw disparity-space correlation disparity result and the sub-pixel disparity estimate of another one of the adjacent pixels is computed using the optimized disparity-space correlation disparity result.

Example 4 includes the subject matter of any of Examples 1-3, wherein the optimized disparity-space correlation disparity result is computed using a scan-line optimization technique.

Example 5 includes the subject matter of any of Examples 1-3, wherein the optimized disparity-space correlation disparity result is computed using a semi-global optimization technique.

Example 6 includes the subject matter of any of Examples 1-5, wherein the sub-pixel disparity estimate represents a difference in coordinates of the first pixel in the reference image and coordinates of the second pixel in the input image.

Example 7 includes the subject matter of any of Examples 1-6, wherein the method further comprises computing both raw and optimized sub-pixel disparity estimates for all pixels in the reference image, wherein the range image is based at least in part on all of the raw and optimized sub-pixel disparity estimates.

Example 8 is a system for generating a range image. The system comprises a range image generation module configured to receive data representing an input image. The system further comprises a correlation sub-module configured to compute a raw disparity-space correlation disparity result representing a disparity between a first pixel in a reference image and a second pixel in the input image; and compute an optimized disparity-space correlation disparity result representing a disparity between the first pixel and the second pixel. The system further comprises a disparity estimating sub-module configured to compute both raw and optimized sub-pixel disparity estimates. The system further comprises an image generation sub-module configured to generate a range image based at least in part on the raw and optimized sub-pixel disparity estimates.

Example 9 includes the subject matter of Example 8, wherein the system further comprises a filtering sub-module configured to apply a bilateral filter to sub-pixel disparity estimates of at least two adjacent pixels in the reference image.

Example 10 includes the subject matter of Example 9, wherein the process further comprises computing both raw and optimized sub-pixel disparity estimates for all pixels in the reference image, wherein the range image is based at least in part on all of the raw and optimized sub-pixel disparity estimates.

Example 11 includes the subject matter of any of Examples 8-10, wherein the optimized disparity-space correlation disparity result is computed using a scan-line optimization technique.

Example 12 includes the subject matter of any of Examples 8-10, wherein the optimized disparity-space correlation disparity result is computed using a semi-global optimization technique.

Example 13 includes the subject matter of any of Examples 8-12, wherein the sub-pixel disparity estimate represents a difference in coordinates of the first pixel in the reference image and coordinates of the second pixel in the input image.

Example 14 includes the subject matter of any of Examiner 8-13, wherein the disparity estimating sub-module is further configured to compute both raw and optimized sub-pixel disparity estimates for all pixels in the reference image, wherein the range image is based at least in part on all of the raw and optimized sub-pixel disparity estimates.

Example 15 is a non-transitory computer readable medium having instructions encoded thereon that, when executed by one or more processors, cause process for generating a range image to be carried out. The process comprises receiving data representing an input image. The process further comprises computing a raw disparity-space correlation disparity result representing a disparity between a first pixel in a reference image and a second pixel in the input image, and computing an optimized disparity-space correlation disparity result representing a disparity between the first pixel and the second pixel. The process further comprises computing a difference between the raw sub-pixel disparity estimate and the optimized disparity-space sub-pixel disparity value; computing a sub-pixel disparity estimate for the first pixel using the raw disparity-space correlation disparity result where the difference is less than or equal to a threshold value and using the optimized disparity-space correlation disparity result where the difference is greater than the threshold value; and generating a range image based at least in part on the raw and optimized sub-pixel disparity estimates.

Example 16 includes the subject matter of Example 15, wherein the generating of the range image comprises applying a bilateral filter to sub-pixel disparity estimates of at least two adjacent pixels in the reference image.

Example 17 includes the subject matter of Example 16, wherein the sub-pixel disparity estimate of one of the adjacent pixels is computed using the raw disparity-space correlation disparity result and the sub-pixel disparity estimate of another one of the adjacent pixels is computed using the optimized disparity-space correlation disparity result.

Example 18 includes the subject matter of any of Examples 15-17, wherein the optimized disparity-space correlation disparity result is computed using a scan-line optimization technique.

Example 19 includes the subject matter of any of Examples 15-17, wherein the optimized disparity-space correlation disparity result is computed using a semi-global optimization technique.

Example 20 includes the subject matter of any of Examples 15-19, wherein the sub-pixel disparity estimate represents a difference in coordinates of the first pixel in the reference image and coordinates of the second pixel in the input image.

Example 21 includes the subject matter of any of Examples 15-20, wherein the process further comprises computing both raw and optimized sub-pixel disparity estimates for all pixels in the reference image, wherein the range image is based at least in part on all of the raw and optimized sub-pixel disparity estimates.

The foregoing description of example embodiments is presented for the purposes of illustration and description. It is not intended to be exhaustive or to limit this disclosure to the precise forms described. Many modifications and variations are possible in light of this disclosure. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A computer-implemented range image generation method comprising:
   receiving, by a computer processor, data representing an input image and a reference image;
   computing, by the computer processor, a raw disparity-space correlation disparity result representing a non-optimized disparity between a first pixel in a reference image and a second pixel in the input image;
   computing, by the computer processor, an optimized disparity-space correlation disparity result representing a disparity between a third pixel in the reference image and a fourth pixel in the input image, the first and third pixels being different pixels;
   computing, by the computer processor, a raw sub-pixel disparity estimate for the first pixel and an optimized sub-pixel disparity estimate for the third pixel using the raw disparity-space correlation disparity result and the optimized disparity-space correlation disparity result, respectively; and
   generating, by the computer processor, a range image,
   wherein, with respect to the first pixel, the range image is based on the raw sub-pixel disparity estimate and is not based on the optimized sub-pixel disparity estimate,
   wherein, with respect to the third pixel, the range image is based on the optimized sub-pixel disparity estimate and is not based on the raw sub-pixel disparity estimate, and
   wherein the raw disparity-space correlation disparity result and the optimized disparity-space correlation disparity result are each weighted in proportion to a ratio between the raw sub-pixel correlation disparity result and the optimized sub-pixel correlation disparity result.

2. The method of claim 1, wherein the generating of the range image comprises applying, by the computer processor, a bilateral filter to the raw and optimized sub-pixel disparity estimates.

3. The method of claim 1, wherein the optimized disparity-space correlation disparity result is computed using a scan-line optimization technique.

4. The method of claim 1, wherein the optimized disparity-space correlation disparity result is computed using a semi-global optimization technique.

5. The method of claim 1, wherein the sub-pixel disparity estimate represents a difference in coordinates of the first pixel in the reference image and coordinates of the second pixel in the input image.

6. The method of claim 1, further comprising computing both raw and optimized sub-pixel disparity estimates for all pixels in the reference image, wherein the range image is based at least in part on one of the raw and optimized sub-pixel disparity estimates for a given pixel.

7. A system for generating a range image, the system comprising:
   a range image generation module configured to receive data representing an input image;
   a correlation sub-module configured to:
      compute a raw disparity-space correlation disparity result representing a non-optimized disparity between a first pixel in a reference image and a second pixel in the input image; and
      compute an optimized disparity-space correlation disparity result representing a disparity between a third pixel in the reference image and a fourth pixel in the input image, the first and third pixels being different pixels;
   a disparity estimating sub-module configured to:
      compute a raw sub-pixel disparity estimate for the first pixel and an optimized sub-pixel disparity estimate for the third pixel using the raw disparity-space correlation disparity result and the optimized disparity-space correlation disparity result, respectively; and
   an image generation sub-module configured to generate a range image,
      wherein, with respect to the first pixel, the range image is based on the raw sub-pixel disparity estimate and is not based on the optimized sub-pixel disparity estimate,
      wherein, with respect to the third pixel, the range image is based on the optimized sub-pixel disparity estimate and is not based on the raw sub-pixel disparity estimate, and
   wherein the raw disparity-space correlation disparity result and the optimized disparity-space correlation disparity result are each weighted in proportion to a ratio between the raw sub-pixel correlation disparity result and the optimized sub-pixel correlation disparity result.

8. The system of claim 7, further comprising a filtering sub-module configured to apply a bilateral filter to the raw and optimized sub-pixel disparity estimates.

9. The system of claim 7, wherein the optimized disparity-space correlation disparity result is computed using a scan-line optimization technique.

10. The system of claim 7, wherein the optimized disparity-space correlation disparity result is computed using a semi-global optimization technique.

11. The system of claim 7, wherein the sub-pixel disparity estimate represents a difference in coordinates of the first pixel in the reference image and coordinates of the second pixel in the input image.

12. The system of claim 7, wherein the disparity estimating sub-module is further configured to compute both raw and optimized sub-pixel disparity estimates for all pixels in the reference image, wherein the range image is based at least in part on one of the raw and optimized sub-pixel disparity estimates for a given pixel.

13. A non-transitory computer readable medium having instructions encoded thereon that, when executed by one or more processors, cause process for generating a range image to be carried out, the process comprising:
receiving data representing an input image;
computing a raw disparity-space correlation disparity result representing a non-optimized disparity between a first pixel in a reference image and a second pixel in the input image;
computing an optimized disparity-space correlation disparity result representing a disparity between a third pixel in the reference image and a fourth pixel in the input image, the first and third pixels being different pixels;
computing a raw sub-pixel disparity estimate for the first pixel and an optimized sub-pixel disparity estimate for the third pixel using the raw disparity-space correlation disparity result and the optimized disparity-space correlation disparity result, respectively; and
generating a range image,
wherein, with respect to the first pixel, the range image is based on the raw sub-pixel disparity estimate and is not based on the optimized sub-pixel disparity estimate,
wherein, with respect to the third pixel, the range image is based on the optimized sub-pixel disparity estimate and is not based on the raw sub-pixel disparity estimate, and
wherein the raw disparity-space correlation disparity result and the optimized disparity-space correlation disparity result are each weighted in proportion to a ratio between the raw sub-pixel correlation disparity result and the optimized sub-pixel correlation disparity result.

14. The computer readable medium of claim 13, wherein the generating of the range image comprises applying a bilateral filter to the raw and optimized sub-pixel disparity estimates.

15. The computer readable medium of claim 13, wherein the optimized disparity-space correlation disparity result is computed using a scan-line optimization technique.

16. The computer readable medium of claim 13, wherein the optimized disparity-space correlation disparity result is computed using a semi-global optimization technique.

17. The computer readable medium of claim 13, wherein the sub-pixel disparity estimate represents a difference in coordinates of the first pixel in the reference image and coordinates of the second pixel in the input image.

18. The computer readable medium of claim 13, wherein the process further comprises computing both raw and optimized sub-pixel disparity estimates for all pixels in the reference image, wherein the range image is based at least in part on one of the raw and optimized sub-pixel disparity estimates for a given pixel.

* * * * *